(12) United States Patent
Sundin

(10) Patent No.: US 11,179,731 B2
(45) Date of Patent: Nov. 23, 2021

(54) CENTRIFUGAL SEPARATOR WITH A SENSOR DEVICE

(71) Applicant: ALFA LAVAL CORPORATE AB, Lund (SE)

(72) Inventor: Magnus Sundin, Vendelsö (SE)

(73) Assignee: ALFA LAVAL CORPORATE AB, Lund (SE)

( * ) Notice: Subject to any disclaimer, the term of this patent is extended or adjusted under 35 U.S.C. 154(b) by 463 days.

(21) Appl. No.: 16/099,592

(22) PCT Filed: Jun. 8, 2017

(86) PCT No.: PCT/EP2017/063892
§ 371 (c)(1),
(2) Date: Nov. 7, 2018

(87) PCT Pub. No.: WO2017/220330
PCT Pub. Date: Dec. 28, 2017

(65) Prior Publication Data
US 2019/0143342 A1 May 16, 2019

(30) Foreign Application Priority Data
Jun. 23, 2016 (EP) .................................. 16175966

(51) Int. Cl.
*B04B 7/06* (2006.01)
*B04B 1/10* (2006.01)
(Continued)

(52) U.S. Cl.
CPC .................. *B04B 7/06* (2013.01); *B04B 1/10* (2013.01); *B04B 11/04* (2013.01); *B04B 13/00* (2013.01);
(Continued)

(58) Field of Classification Search
CPC .. B04B 7/06; B04B 1/10; B04B 11/04; B04B 13/00; G01P 3/26; G01P 15/09; G01M 3/24
(Continued)

(56) References Cited

U.S. PATENT DOCUMENTS 4,206,871 A * 6/1980 Nilsson ..................... B04B 1/10
340/605
4,410,318 A * 10/1983 Bjork ........................ B04B 1/10
494/10
2016/0251605 A1 9/2016 Waubke

FOREIGN PATENT DOCUMENTS

CN 102319641 A 1/2012
CN 102669450 A 1/2013
(Continued)

OTHER PUBLICATIONS

English translation of the Chinese Office Action and Search Report. dated Mar. 31, 2020, for Chinese Application No. 201780038734.0.
(Continued)

*Primary Examiner* — Walter D. Griffin
*Assistant Examiner* — Shuyi S. Liu
(74) *Attorney, Agent, or Firm* — Birch, Stewart, Kolasch & Birch, LLP

(57) ABSTRACT

A centrifugal separator has a stationary casing and a centrifuge rotor, which is provided in the stationary casing and arranged to rotate around an axis of rotation at a rotary speed and which includes a plurality of nozzles for discharge of a product from the centrifuge rotor. The centrifugal separator includes a sensor device which includes a transfer element, which has a first part and a second part and which is configured to be mounted in such a way that the first part is located inside the stationary casing and outside the centrifuge rotor and that the second part is located outside the stationary casing. At least the first part of the transfer
(Continued)

element has an elongated shape, a receiving head, which includes the first part of the transfer element. The sensor device further includes a sensor element, which is mounted to the second part of transfer element and which is configured to sense vibrations and/or shock pulses propagating from the receiving head to the sensor element, and an evaluation unit, which communicates with the sensor element for transmitting signals from the sensor element to the evaluation unit. The transfer element is mounted in the stationary casing, directed such that the end face of the receiving head faces the passing jets from the nozzles during rotation of the rotor. A centrifugal separator with such a sensor device is also disclosed.

20 Claims, 3 Drawing Sheets

(51) Int. Cl.
*B04B 11/04* (2006.01)
*B04B 13/00* (2006.01)
*G01M 3/24* (2006.01)
*G01P 3/26* (2006.01)
*G01P 15/09* (2006.01)

(52) U.S. Cl.
CPC ............... *G01M 3/24* (2013.01); *G01P 3/26* (2013.01); *G01P 15/09* (2013.01)

(58) Field of Classification Search
USPC .......................... 494/1, 10, 48, 82; 340/605
See application file for complete search history.

(56) References Cited

FOREIGN PATENT DOCUMENTS

| DE | 39 25 198 A1 | 3/1990 | |
|---|---|---|---|
| EP | 0 049 089 A2 | 4/1982 | |
| EP | 0 049 089 A3 | 5/1983 | |
| EP | 0 456 861 A1 | 11/1991 | |
| WO | WO 2011/113850 A1 | 9/2011 | |
| WO | WO 2012/158093 A1 | 11/2012 | |
| WO | WO-2012158093 A1 * | 11/2012 | ............... B04B 1/10 |
| WO | WO 2015/058957 A1 | 4/2015 | |

OTHER PUBLICATIONS

International Search Report, issued in PCT/EP2017/063892, dated Sep. 6, 2017.
Written Opinion of the International Searching Authority, issued in PCT/EP2017/063892, dated Sep. 6, 2017.

* cited by examiner

CENTRIFUGAL SEPARATOR WITH A SENSOR DEVICE

THE BACKGROUND OF THE INVENTION AND PRIOR ART

The present invention refers generally to the supervision of the operation of centrifugal separators having nozzles for the discharge of a product, such as a liquid, which for instance comprises or consists of sludge. More precisely, the invention refers to a centrifugal separator having a stationary casing and a centrifuge rotor, which is provided in the stationary casing and arranged to rotate around an axis of rotation at a rotary speed and which comprises a plurality of nozzles for discharge of a product from the centrifuge rotor in a direction, wherein the centrifugal separator comprises a sensor device, which comprises a transfer element, which has a first part and a second part and which is configured to be mounted in such a way that the first part is located inside the stationary casing and outside the centrifuge rotor and that the second part is located outside the stationary casing, wherein at least the first part of the transfer element has an elongated shape, a receiving head, which is comprised by the first part of the transfer element, a sensor element, which is mounted to the second part of transfer element and which is configured to sense vibrations and/or shock pulses propagating from the receiving head to the sensor element, and an evaluation unit, which communicates with the sensor element for transmitting signals from the sensor element to the evaluation unit.

SUMMARY OF THE INVENTION

The object of the present invention is to provide a sensor device which has a high reliability and which is suitable for providing information about a plurality of various parameters and conditions of the centrifugal separator. Furthermore, it is aimed at a sensor device having a low sensitivity to disturbances and defects.

This object is achieved by the sensor device initially defined, which is characterized in that the transfer element is mounted in the stationary casing, and directed such that the end face of the receiving head faces the passing jets from the nozzles during rotation of the rotor.

When the product, for instance a liquid or sludge, from the nozzles hits the receiving head, vibrations will be created in the receiving head and the transfer element. These vibrations may have various frequencies from 1-600 Hz up to hundreds of kHz. Such vibrations will in a secure and reliable manner propagate in the material of the transfer element to the sensor element provided outside the stationary casing and thus not directly subjected to the extreme environment which is present inside the stationary casing. The sensor device according to the invention may be used for sensing the exact point of time when the product is discharged through the nozzles for identifying which nozzle or nozzles having a reduced functioning and possibly for determining the rotary speed of the centrifuge rotor, and, in the case that the nozzles are intermittently openable and thus mostly closed, if any of the nozzles presents a small leakage. The sensor device according to the invention provides a very sensitive sensing of vibrations, and thus a possible leakage may be detected at a very early stage before the leakage has any serious impact on the function and the performance of the centrifugal separator.

According to a further embodiment of the invention, the transfer element may be directed such that during rotation the end face of the receiving head faces the opening of a certain nozzle at a substantially right angle. Thus the jets from the nozzles will transmit vibrations and/or shock pulses substantially straight into the transfer element and thus provide a strong signal for the sensor element to register.

According to a further embodiment of the invention, the sensor element may be attached to the end of the second part of the transfer element.

According to a further embodiment of the invention, the transfer element may be manufactured of a material configured to permit said propagation of vibrations from the receiving head to the sensor element.

According to a further embodiment of the invention, the sensor element comprises a shock pulse transducer with an accelerometer, preferably a linear accelerometer or accelerometer with one axis. By means of such an accelerometer, vibrations with the above defined frequencies may in a secure manner be sensed and suitable signals provided for further transfer to the evaluation unit. A linear accelerometer is particularly advantageous when determining the direction of the possible leakage.

According to a further embodiment of the invention, the evaluation unit communicates with the sensor element via a conduit comprising a zener barrier.

According to a further embodiment of the invention, the evaluation unit is configured to calculate the rotary speed of the centrifuge rotor by means of said signals.

According to a further embodiment of the invention, the evaluation unit is configured to establish a possible leakage from the nozzles by means of said signals.

According to a further embodiment of the invention, parts of the envelope surface of the transfer element except the receiving head is surrounded by a protecting tube which protects the first part of the transfer element from splashing and vibrations not generated from the receiving head.

According to a further embodiment of the invention, the protecting tube is suspended by a first rubber bushing between the protecting tube and the first part of the transfer element, close to the receiving head.

According to a further embodiment of the invention, the protecting tube is threaded on its exterior surface to fit in a correspondingly threaded hole in the stationary casing.

According to a further embodiment of the invention, a cylindrical spacing sleeve of optional length is thread on the transfer element and abuts with its first end against a stop on the protecting tube at the second part of the transfer element and when the transfer element is mounted in the hole of the stationary casing its second end rests against the exterior wall of the stationary casing, thus defining the position of transfer element and its receiving head.

According to a further embodiment of the invention, said nozzles of the centrifuge rotor are permanently open. An advantage that is particularly important in such centrifugal separators is the possibility to determine the size of the flow of the product discharged through the nozzles. This may be advantageous in order to detect for instance if one or several of the nozzles are clogged, or the degree of clogging of the nozzles. According to the definitions above it is also possible to establish which of the nozzles that has a certain degree of clogging. The wear of permanently open nozzles may also be established in accordance with what has been defined above.

According to a further embodiment of the invention, said nozzles are intermittently openable. In such a centrifugal separator, the inventive sensor device is particularly advantageous for establishing by means of the evaluation unit a possible leakage from the nozzles. The sensor device may also according to this embodiment be used for determining the rotary speed of the centrifuge rotor.

BRIEF DESCRIPTION OF THE DRAWINGS

The invention is now to be explained more closely through a description of various embodiments and with reference to the drawings attached hereto.

DETAILED DESCRIPTION OF VARIOUS EMBODIMENTS OF THE INVENTION

Figure 1:
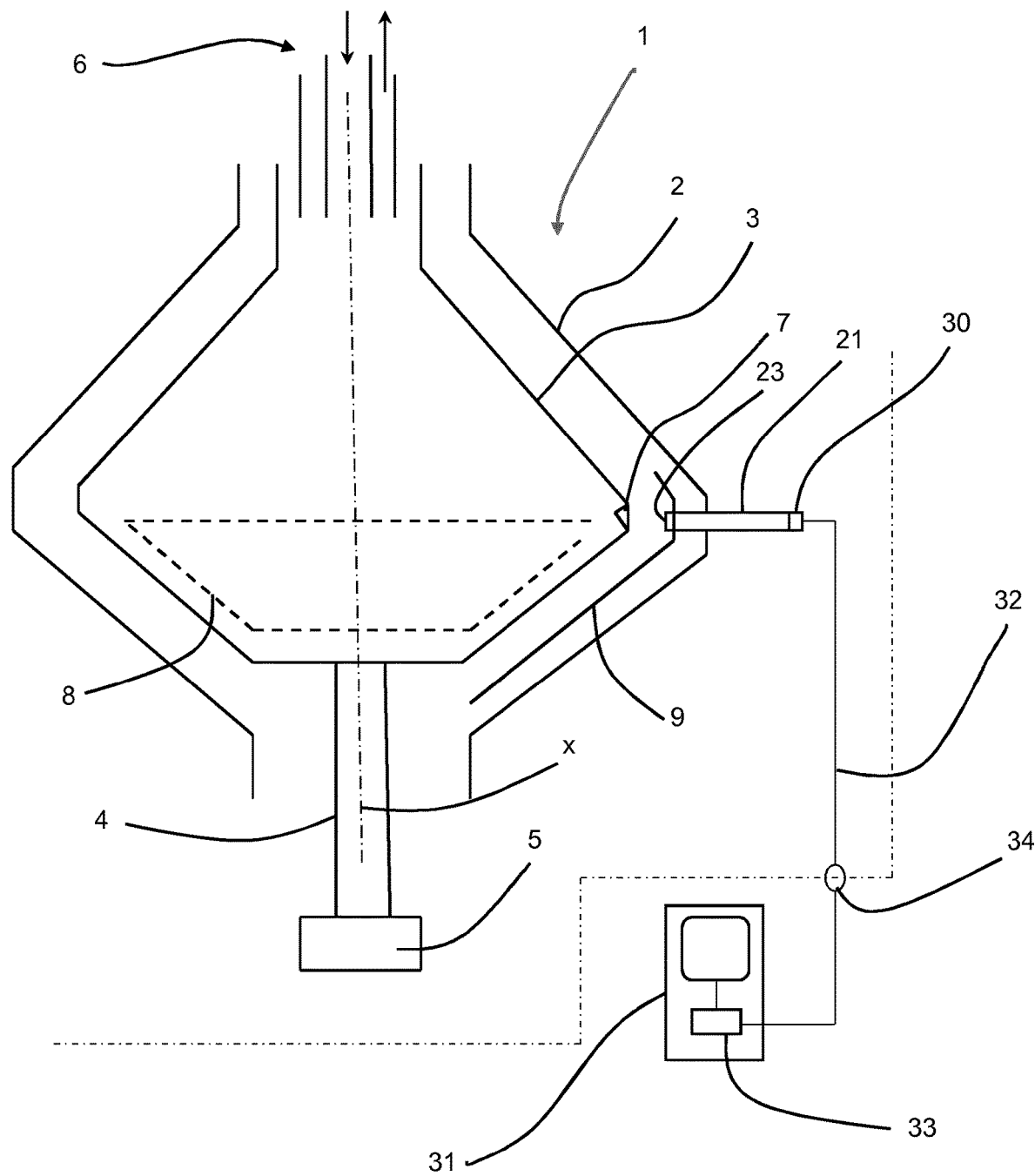
FIG. 1 discloses a schematically sectional view of a centrifugal separator having a sensor device according to the invention.

FIG. 1 discloses a centrifugal separator 1 having a stationary casing 2 and a centrifuge rotor 3 which is provided to rotate around an axis x of rotation in the stationary casing 2. The centrifuge rotor 3 is driven via a spindle 4 by a schematically indicated drive motor 5. The centrifugal separator 1 comprises inlet and outlet conduits which are schematically indicated at 6 and which are configured in a manner known per se.

Furthermore, the centrifuge rotor 3 comprises a plurality of nozzles 7 for discharge of a product, such as liquid, which for instance may comprise or consist of sludge. The nozzles 7 may be permanently open nozzles. The nozzles 7 may alternatively be intermittently openable nozzles which may open in a manner known per se by means of a schematically indicated valve disc 8 provided within the centrifuge rotor 3. The nozzles 7 are distributed, or preferably uniformly distributed, along the periphery of the centrifuge rotor 3. Outside the nozzles 7, a guide element 9 is provided. The guide element 9 is configured to receive and guide the product discharged through the nozzles 7 out of the stationary casing 7 and the centrifugal separator 1 in a suitable manner.

A sensor device for sensing vibrations and shock pulses is also provided in connection to the centrifugal separator 1 or is a part of the centrifugal separator 1. The sensor device comprises a transfer element 21 which is manufactured of a suitable material, for instance a metallic material.

Figure 2:
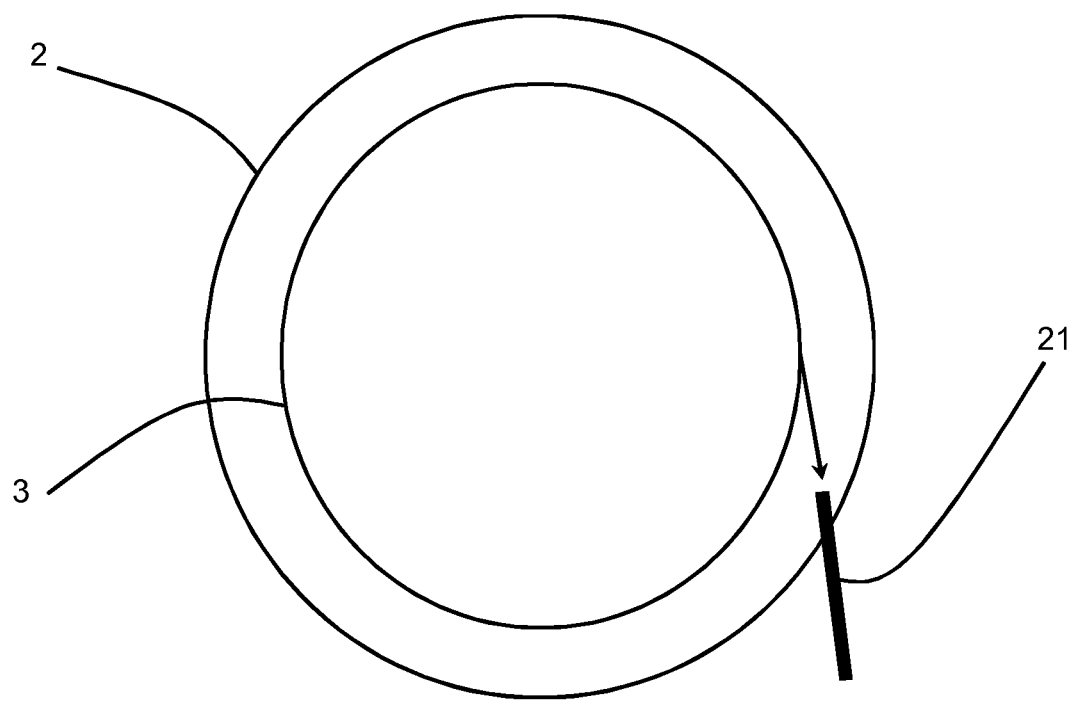
FIG. 2 discloses a schematically sectional view from above of a centrifugal separator.

The transfer element 21 has a first part 21' having an inner end, and a second part 21" having an outer end, see FIG. 2, and being configured to be mounted to the centrifugal separator 1 in such a way that the first part 21' and the inner end are located inside the stationary casing 2 and outside the centrifuge rotor 3, and that the second part 21" and the outer end are located outside the stationary casing 2.

In the embodiment disclosed, the transfer element 21, i.e. both the first part 21' and the second part 21", has a common elongated or rod like shape. The transfer element 21 extends in a longitudinal direction x'. The longitudinal direction x' may be parallel, or substantially parallel, to the axis x of rotation. The longitudinal direction x' may be permitted to form an angle to the axis x of rotation. According to the embodiment in FIG. 3 the transfer element 21 may instead extend horizontally in substantially the same direction x" as a nozzle jet passing the transfer element 21. However, it is possible to merely let the first part 21' have said elongated shape. The second part 21" which is located outside the stationary casing may have any other suitable shape and for instance be angled. The transfer element 21 is thus attached to the centrifugal separator 1 and more precisely in the stationary casing 2.

Figure 3:
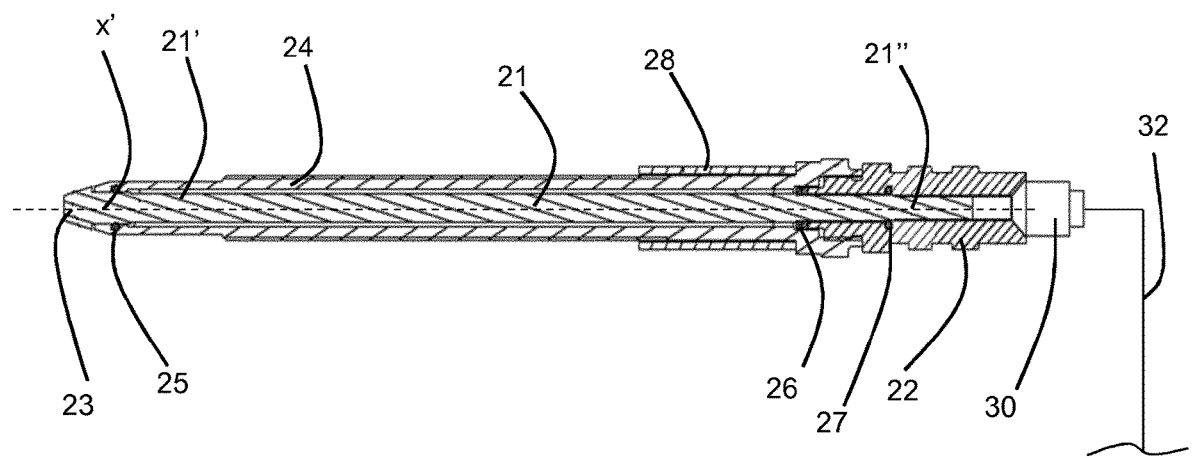
FIG. 3 discloses a partly sectional side view of a part of the sensor device according to the invention.

As can be seen in FIG. 3, the transfer element 21 comprises a receiving head 23 which is comprised by the first part 21' and thus is provided at the inner end of the transfer element 21, and more precisely immediately outside the nozzles 7 of the centrifuge rotor 3 but inside the stationary casing 2 and the guide element 9. According to the embodiment in FIG. 3 the receiving head 23 is the tip of the first part 21' of the transfer element 21. Parts of the envelope surface of the transfer element 21 except the receiving head 23 may be surrounded by a protecting tube 24 which protects the first part 21' of the transfer element 21 from splashing and vibrations not generated from the receiving head 23. The protecting tube 24 may thus be suspended by a first rubber bushing 25 between the same and the first part 21' of the transfer element 21, close to the receiving head 23. The protecting tube 24 is also suspended by a second rubber bushing 26 between the same and the second part 21" of the transfer element 21. The transfer element 21 is suspended by said second rubber bushing 26 together with a third bushing 27 between said transfer element 21 and a cylindrical holder member 22. This will increase the transference of shock pulses through the transfer element 21 and create a stronger signal through the transfer element 21.

To mount the transfer element 21 in the stationary casing 2 of the centrifugal separator 1 the protecting tube 24 is threaded on its exterior surface which makes it possible to fit in a correspondingly threaded hole in the stationary casing 2. In order to adapt the position of the receiving head 23 to the nozzle jets, a cylindrical spacing sleeve 28 of optional length may be thread on the transfer element 21 and abut with its first end 28a against a stop 29 on the protecting tube 24 at the second part 21" of the transfer element 21. When the transfer element 21 is mounted in the hole of the stationary casing 2 the second end 28b of the cylindrical spacing sleeve 28 will rest against the exterior wall of the stationary casing 2, thus defining the position of transfer element 21 and its receiving head 23.

The transfer element 21 may instead be directly mounted in the stationary casing, without the suspension of bushings.

As is disclosed in FIG. 2, in a centrifugal separator with nozzles, the nozzles 7 are usually mounted in the centrifugal rotor 3 in such a manner that their openings are directed in the rotational direction of the rotor 3. The direction may be substantially tangential but preferred is if the openings of the nozzles 7 have a slight outward angle as the jets otherwise may hit the rotor wall and cause abrasive damages.

The transfer element 21 is mounted in the stationary casing 2 horizontally at the same level as the nozzles 7, directed such that the end face of the receiving head 23 faces the passing jets from the nozzles 7 during rotation of the rotor. Particularly may the transfer element 21 be directed such that during rotation the end face of the receiving head 23 faces the opening of a certain nozzle 7 at a substantially right angle.

The transfer element 21 will be subjected to erosion from the nozzle jets. It may therefore be manufactured from a wear resistant material or be coated by such a material or surface hardened.

The sensor device also comprises a sensor element 30 which is mounted to the second part 21" of the transfer element 21, and in the embodiment disclosed in the proximity of the outer end of the transfer element 21. The sensor element 30 may comprise or consist of a shock pulse transducer, with an accelerometer, preferably a linear accelerometer. The accelerometer may comprise or consist of a piezoelectric element. Such a piezoelectric element generates a signal in the form of an electric voltage when it is deformed, for instance due to vibrations or shock pulses. The sensor may internally be isolated with a Faraday-shield and have a vibration measuring range of 600 m/s² and a shock pulse measuring range of −12 to 75 dB.

The sensor device also comprises an evaluation unit 31 which communicates with the sensor element 30, for instance wirelessly or via a conduit 32, for transferring signals from the sensor element 30 to the evaluation unit 31. The evaluation unit 31 comprises a processor 33 and is configured to interpret the signals generated by the sensor element 30. The evaluation unit 31 also comprises a display which for instance may include an oscilloscope. The conduit 32 comprises a zener barrier 34.

The sensor element 30 is configured to sense the vibrations that propagate from the receiving head 23 to the sensor element 30 via the transfer element 21. The vibrations propagate in the material of the transfer element 21.

In the case when the nozzles 7 are intermittently openable, the sensor device may operate in such a way that when the nozzles 7 during a short time period are opened, the product is discharged at a high velocity from the centrifuge rotor 3. This product will hit the receiving element 21 and more precisely the receiving head 23. Vibrations will then be generated in the transfer element 21, and these propagate to the sensor element 30. The signals which are then generated by the sensor element 30 are conveyed to the evaluation unit 31 and are processed by the processor 33. The evaluation unit 31 is configured to analyze the signals from the sensor element 30 and to establish a plurality of various parameters and states. The signals obtained may for instance comprise the following parameters:

Peak value
Rise time
Fall time
Width
Surface.

By means of these parameters, knowledge about the discharge of the product may be obtained. For instance, it can be mentioned that the surface may be assumed to be proportional to the flow, i.e. the quantity of the product discharged through the nozzles 7. The evaluation unit 31 may also be adapted to detect if one or several of the nozzles 7 leaks. If such a leakage arises, a smaller amount of the product will more or less continuously be discharged and hit the receiving head 23 of the transfer element 21. Again, vibrations will then be generated and propagate to the sensor element 30 which delivers corresponding signals to the evaluation unit 31. The evaluation unit 31 may then be configured to give the user information about the present leakage, for instance through any kind of alarm. It is to be noted that the sensor device is very sensitive and that a leakage may be detected at a very early stage, wherein suitable repair measures may be taken.

Furthermore, the sensor device may be used for detecting a possible leakage of the operating liquid used for controlling the position of the valve disc 8.

It is also to be noted that sensor device and the evaluation unit 31 may be configured to calculate the rotary speed of the centrifuge rotor by means of the signals from the sensor element 30. In combination with a determination of the rotary speed, the detection of a leakage and possibly also the position of the nozzles 7, it is possible to calculate which of the nozzles 7 possibly leaks by means of the processor 33 of the evaluation unit 31. In the case that the nozzles 7 are permanently open, the sensor device and the evaluation unit 31 may be configured to calculate the rotary speed of the centrifuge rotor 3 by means of the signals from the sensor element 30. Also in this case it is possible to obtain information and knowledge about the discharged product, for instance the discharge direction of the product and the position or path of the product from the nozzles 7, by means of signals from the sensor element 30. The sensor device may in this case also be used for detecting if any of the nozzles 7 is clogged or is beginning to be clogged through a determination of the flow of the product that is discharged.

Finally, it is also to be noted that the sensor device and the evaluation unit 31 may detect vibrations emanating from other sources than the nozzles 7, for instance various defects in the centrifugal separator 1 such as play in the bearings etc. It can be assumed that such defects will result in vibrations with other frequencies than those which arise at leakage and discharge of the product, and that these defects thus are possible to detect.

The invention is not limited to the embodiments disclosed but may be modified and varied within the scope of the following claims.

The invention claimed is:

1. A centrifugal separator, comprising:
   a stationary casing;
   a centrifuge rotor, the centrifuge rotor being provided in the stationary casing and being arranged to rotate around an axis of rotation at a rotary speed, and comprising a plurality of nozzles for discharge of a product from the centrifuge rotor in a direction;
   a sensor device, the sensor device comprising:
      a transfer element having a first part and a second part and being configured to be mounted in such a way that the first part is located inside the stationary casing and outside the centrifuge rotor and that the second part is located outside the stationary casing, at least the first part of the transfer element having an elongated shape;
      a receiving head, the receiving head being comprised by the first part of the transfer element;
      a sensor element, the sensor element being mounted to the second part of transfer element and being configured to sense vibrations and/or shock pulses propagating from the receiving head to the sensor element; and
      an evaluation unit, the evaluating unit communicating with the sensor element for transmitting signals from the sensor element to the evaluation unit,
   wherein the transfer element is mounted in the stationary casing, directed such that the end face of the receiving head faces passing jets from the nozzles during rotation of the rotor, and
   wherein parts of an envelope surface of the transfer element, except the receiving head, are surrounded by a protecting tube which protects the first part of the transfer element from splashing and vibrations not generated from the receiving head.

2. The centrifugal separator according to claim 1, wherein the transfer element is directed such that during rotation the end face of the receiving head faces the opening of a certain nozzle at a substantially right angle.

3. The centrifugal separator according to claim 1, wherein the sensor element is attached to the end of the second part of the transfer element.

4. The centrifugal separator according to claim 1, wherein the transfer element is manufactured of a material configured to permit said propagation of vibrations from the receiving head to the sensor element.

5. The centrifugal separator according to claim 1, wherein the sensor element comprises a shock pulse transducer with an accelerometer.

6. The centrifugal separator according to claim 1, wherein the evaluation unit communicates with the sensor element via a conduit comprising a zener barrier.

7. The centrifugal separator according to claim 1, wherein the evaluation unit is configured to calculate the rotary speed of the centrifuge rotor by means of said signals.

8. The centrifugal separator according to claim 1, wherein the nozzles comprise intermittently openable nozzles and wherein the evaluation unit is configured to establish a possible leakage from the nozzles by means of said signals.

9. The centrifugal separator according to claim 1, wherein the protecting tube is suspended by a first rubber bushing between the protecting tube and the first part-of the transfer element, close to the receiving head.

10. The centrifugal separator according to claim 1, wherein the protecting tube is threaded on an exterior surface thereof to fit in a correspondingly threaded hole in the stationary casing.

11. The centrifugal separator according to claim 1, w herein a cylindrical spacing sleeve of optional length is thread on the transfer element and abuts with a first end thereof against a stop on the protecting tube at the second part of the transfer element, and when the transfer element is mounted in a hole of the stationary casing a second end thereof rests against the exterior wall of the stationary casing a second end thereof rests against the exterior w all of the stationary casing, thus defining the position of the transfer element and the receiving head.

12. The centrifugal separator according to claim 11, wherein said nozzles are permanently open.

13. The centrifugal separator according to claim 11, wherein said nozzles are intermittently openable.

14. The centrifugal separator according to claim 2, wherein the sensor element is attached to the end of the second part of the transfer element.

15. The centrifugal separator according to claim 2, wherein the transfer element is manufactured of a material configured to permit said propagation of vibrations from the receiving head to sensor element.

16. The centrifugal separator according to claim 3, wherein the transfer element is manufactured of a material configured to permit said propagation of vibrations from the receiving head to sensor element.

17. The centrifugal separator according to claim 1, wherein the axis of the transfer element is spaced from the axis of rotation.

18. The centrifugal separator according to claim 17, wherein the axis of the transfer element is tangential to the rotor.

19. The centrifugal separator according to claim 1, w herein the transfer element has a first end and a second end, w herein the sensor element directly contacts the second end of the transfer element, and w herein a cylindrical holder surrounds the transfer element and sensor element.

20. The centrifugal separator according to claim 1, wherein the protecting tube extends into the stationary casing.

\* \* \* \* \*